US007765856B2

(12) United States Patent
Wilbraham

(10) Patent No.: US 7,765,856 B2
(45) Date of Patent: Aug. 3, 2010

(54) MONITORING OF A FLAME EXISTENCE AND A FLAME TEMPERATURE

(75) Inventor: Nigel Wilbraham, Stourbridge (GB)

(73) Assignee: Siemens Aktiengesellschaft, Munich (DE)

( * ) Notice: Subject to any disclaimer, the term of this patent is extended or adjusted under 35 U.S.C. 154(b) by 4 days.

(21) Appl. No.: 12/229,331

(22) Filed: Aug. 21, 2008

(65) Prior Publication Data

US 2009/0049894 A1 Feb. 26, 2009

(30) Foreign Application Priority Data

Aug. 21, 2007 (GB) ................................ 07016386

(51) Int. Cl.
*G01M 15/14* (2006.01)

(52) U.S. Cl. ................................................ 73/112.01

(58) Field of Classification Search ............... 73/112.01
See application file for complete search history.

(56) References Cited

U.S. PATENT DOCUMENTS 4,422,323 A 12/1983 Linder
4,995,805 A * 2/1991 Hilliard ....................... 431/10
5,257,496 A * 11/1993 Brown et al. .................. 60/773
5,578,828 A 11/1996 Brown
5,777,668 A 7/1998 Amano
5,961,314 A * 10/1999 Myhre et al. .................. 431/79
6,142,665 A * 11/2000 Haffner et al. .............. 374/144
7,112,796 B2 * 9/2006 Brown et al. ........... 250/339.15
7,428,817 B2 * 9/2008 Brunner et al. ............... 60/737
7,484,369 B2 * 2/2009 Myhre ......................... 60/803
7,532,810 B2 * 5/2009 Jayaram et al. ............. 392/390
2003/0106536 A1 6/2003 Sass et al.
2006/0000219 A1 * 1/2006 Myhre ......................... 60/772
2007/0059655 A1 3/2007 Brunner et al.
2008/0042857 A1 * 2/2008 Gregory ..................... 340/600

FOREIGN PATENT DOCUMENTS

DE 102005020328 A1 11/2006
EP 0448310 A1 9/1991
EP 0593413 A1 4/1994
GB 1286651 A 8/1972
WO WO 9811388 A1 3/1998
WO WO 2006067389 A1 6/2006

* cited by examiner

*Primary Examiner*—Lisa M Caputo
*Assistant Examiner*—Freddie Kirkland, III

(57) ABSTRACT

A method for monitoring a flame in a combustion chamber comprising a wall with an outer side is provided, wherein the radiation which is emitted from a part of the outer side of the wall is optically detected by a sensor. Furthermore, a burner is provided, especially for use in a gas turbine. The burner comprises a wall section with an inner side, which shows towards a combustion zone, and an outer side. The burner further comprises a sensor for optically detecting the radiation emitted from the outer side of said wall section.

21 Claims, 5 Drawing Sheets

MONITORING OF A FLAME EXISTENCE AND A FLAME TEMPERATURE

CROSS REFERENCE TO RELATED APPLICATIONS

This application claims the benefits of British application No. 07016386.0 filed Aug. 21, 2007 and is incorporated by reference herein in its entirety.

FIELD OF INVENTION

The present invention relates to a device and a method for monitoring a flame in a combustion chamber. Especially, it relates to a temperature measurement arrangement for use in a burner of a gas turbine engine.

BACKGROUND OF THE INVENTION

A gas turbine engine usually comprises a compressor, a combustion chamber and a turbine. The compressor delivers compressed air for use in the combustion chamber. In the combustion chamber a mixture of air and fuel is combusted by means of a burner in order to produce a hot gas stream which drives the turbine. Typically one or more burners are used. In this context it is important to monitor the flame to avoid instabilities of the combustion process. Therefore, it is desired to detect the presence of the flame and the intensity of the heat release rate from the flame. The heat release rate is an indication of the intensity of the chemical reaction and the stability of the flame.

SUMMARY OF INVENTION

It is an objective of the present invention to provide a method for monitoring a flame in a combustion area like, e.g., a combustion chamber. It is a further objective of the present invention to provide a burner which allows the monitoring of a flame in a combustion zone. It is another objective of the present invention to provide a gas turbine comprising a burner which allows the flame to be monitored. It is a still further objective of the present invention to provide an internal combustion engine which allows the monitoring of a temperature in a cylinder.

The first objective is solved by a method for monitoring a flame in a combustion chamber as claimed in the claims. The second objective is solved by a burner and the third objective is solved by a gas turbine as claimed in the claims. The still further objective is solved by an internal combustion engine. The depending claims define further developments of the invention.

The inventive method for monitoring a flame relates to a combustion chamber which comprises a wall with an inner side and an outer side. While the inner side shows towards the flame in the interior of the combustion chamber, the outer side shows away from the interior and the flame. The method is characterised in that the radiation which is emitted from a part of the outer side of the wall is optically detected by a sensor. The wall of the combustion chamber is heated up depending on the existence and the temperature of a flame inside the combustion chamber. Due to the increased temperature the wall, or especially a particular part of the wall, emits radiation which generally can be detected optically. This is used by the inventive method, wherein the black body radiation from the surface of the combustion chamber is detected based on an optical measurement. This method has the advantage that it is unaffected by rapid changes in temperature. Comparable devices using thermocouples would be likely to fail due to their fragility.

The heat release rate and/or the temperature of the part of the outer side of the wall can be determined by means of the detected radiation. The temperature of the wall provides information regarding the existence and the intensity of the heat release rate from the flame inside the combustion chamber. The heat release rate is an indication of the intensity of the chemical reaction and the stability of the flame.

Generally, the mentioned wall of the combustion chamber may be the actual wall of the combustion chamber. However, it may as well be a wall section of a device attached to the combustion chamber such as, for example, a wall section of a burner. In this case the outer side of a wall section of the burner is to be regarded as a part of the outer side of the combustion chamber in the context of this invention.

The used sensor may, for instance, be a photodiode. Preferably the detected radiation can be focussed on the sensor. In particular, the detected radiation may be focussed by means of an optical lens. A focussing of the emitted radiation reduces the influence of radiation which is not emitted from the desired part of the outer side of the wall of the combustion chamber. This further increases the accuracy of the measurement.

Preferably, the emitted radiation can be detected from the part of the outer side of the wall which is situated opposite a part of the inner side of the wall which is exposed to the flame. In this case the flame directly heats up the inner side of the wall and the heat is transported through the wall to the outer side of the wall by thermal conduction. Hence, the temperature of the outer side of the wall is directly related to the characteristics of the flame inside the combustion chamber. The black body radiation from the outer side of the wall due to the increased temperature can be detected and can be used to determine the temperature of the outer side of the wall. Hence, also temperature of the flame inside the combustion chamber can be determined.

Advantageously, the emitted radiation can be detected from the bottom of a hole in the wall which extends from the outer side of the wall towards the inner side of the wall. At the bottom of a hole the thickness of the wall, which is the distance between the inner and the outer side of the wall, is smaller than at other parts of the wall. This provides very effective and fast heat conduction between the inner and the other side of the wall.

The inventive burner, which is suitable for monitoring the flame in the combustion zone of a combustion chamber, comprises a wall section with an inner side which shows towards a combustion zone, and an outer side which shows away from the combustion zone. It further comprises a sensor for optically detecting the radiation emitted from the outer side of said wall section. This avoids the use of thermocouples which may be very fragile. Preferably, the used sensor is a photodiode. In particular, the burner may further comprise an element to focus the emitted radiation to the sensor. This element may be, for instance, an optical lens. A focussing of the emitted radiation increases the accuracy and sensitivity of the measurement. Furthermore, it reduces the influence of radiation which is not emitted from the outer side of said wall section of the burner.

Advantageously, said wall section forms the bottom of a hole extending from the outer side towards the inner side. The sensor can then be positioned such that it detects the radiation emitted from the bottom of said hole. The sensor may be located at a distance of the bottom of the hole. Moreover, the hole can be evacuated or filled with an inert gas. For instance nitrogen gas may be used. An evacuated or inert gas filled hole protects the sensor, especially the surface of the sensor. Furthermore, it reduces the oxidation of the surface of the bottom of the hole.

In particular, the sensor can be positioned in the burner such that it can detect the radiation emitted from the outer side of a part of the wall, the corresponding inner side of which is exposed to the flame. In the case said part of the wall, from which the emitted radiation is detected, is rather thin the detected radiation provides nearly direct information about the temperature of the flame itself.

The hole and the sensor can especially be positioned in the burner such that it detects the radiation emitted from the outer side of a part of the wall, the corresponding inner side of which is located near the base of the flame. The base of the flame is defined by the location of the attachment of a low pressure region generated by a swirling mix of air and fuel. The detection of the radiation emitted from a region located near the base of the flame provides information about the characteristics of the flame.

The burner may further comprise a light emitting diode to determine the state of the sensor. Especially the state of the photodiode can be auto checked by fitting a light emitting diode to a part of the photodiode's surface. In this case, the photodiode's response to the light emitting diode determines the state of the sensor prior to the starting of the machine fitted with this sensor.

The inventive gas turbine comprises an inventive burner, as previously described. It also has the mentioned advantages.

The still further objective is solved by an internal combustion engine, comprising at least one cylinder with a wall section having an inner side which shows towards a combustion zone, and an outer side which shows away from the combustion zone. The internal combustion engine further comprises a sensor for optically detecting the radiation emitted from the outer side of said wall section. The design of said wall section and the sensor can be the same as in the inventive burner.

The inventive internal combustion engine allows for monitoring the cylinder(s) over a period of time, thereby enabling the monitoring of the average flame temperature or average fuel/air mix etc. This is most suitable for diesel engines at fixed revolutions per minute for periods of time.

BRIEF DESCRIPTION OF THE DRAWINGS

Further features, properties and advantages of the present invention will become clear from the following description of an embodiment in conjunction with the accompanying drawings.

DETAILED DESCRIPTION OF INVENTION

Figure 1:
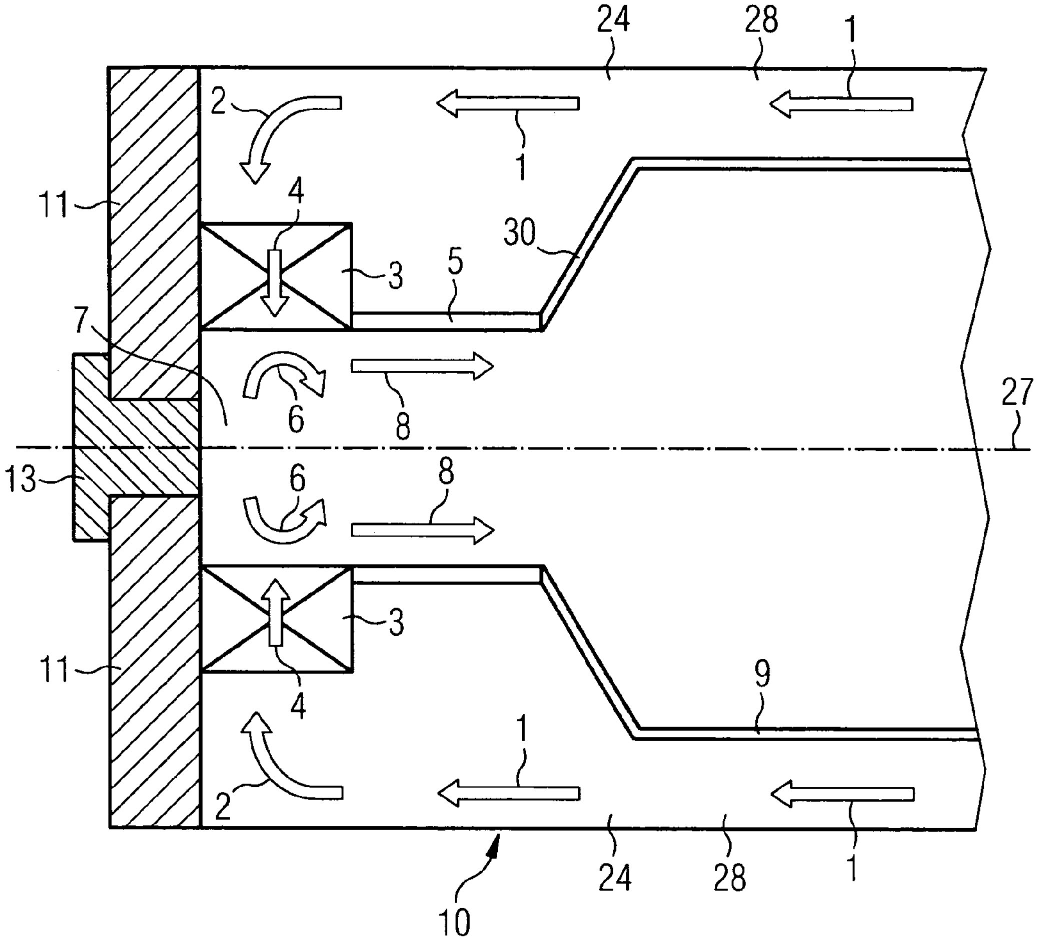
FIG. 1 schematically shows a part of a combustor for a gas turbine engine in a sectional view.

An embodiment of the present invention will now be described with reference to FIGS. 1 to 6. FIG. 1 schematically shows a part of a combustor of a gas turbine engine in a sectional view.

The combustor comprises in flow series a burner with a swirler portion 3 and a burner-head portion 11 attached to the swirler portion 3, a transition piece being referred as combustion pre-chamber 5 and a main combustion chamber 9. The main combustion chamber 9 has a diameter being larger than the diameter of the pre-chamber 5. The main combustion chamber 9 is connected to the pre-chamber 5 via a dome portion 30. In general, the transition piece 5 may be implemented as a one part continuation of the burner towards the main combustion chamber 9, as a one part continuation of the main combustion chamber 9 towards the burner, or as a separate part between the burner and the main combustion chamber 9.

The burner comprises a radial swirler 3 and a head plate 11 to which the swirler 3 is fixed. The head plate 11 is fixed to an outer casing 10 of the combustor. The burner-head plate 11 comprises a removable assembly 13 which is situated in the middle of the burner-head plate 11, as indicated by the centre line 27.

The radial swirler 3, the pre-chamber 5 and the main combustion chamber 9 show radial symmetry about a centre axis or centre line 27. A flow channel 28 for feeding compressor air into the burner is situated between the outer casing 10 and the radial swirler 3, the pre-chamber 5 and the main combustion chamber 9.

Compressed air 24 flows in the direction of the arrows 1 through the flow channel 28 towards the burner-head plate 11. When arriving at the burner-head plate 11 the compressed air 24 turns about 90° so as to enter the radial swirler 3, as indicated by arrows 2. The swirler 3 comprises a plurality of vanes which are arranged in a circle and flow slots being defined between adjacent vanes in the circle. The compressed air flows through the slots into the pre-chamber 5, as indicated by arrows 4. Fuel is introduced into the air flowing through the slots by fuel nozzles located in the vanes. The swirler 3 therefore provides a swirling mixture of air and fuel.

Moreover, the slots are inclined with respect to the combustor's radial direction so that a swirl is generated in the fuel-air-mixture 6 when entering the pre-chamber 5. In doing so the compressed air generally flows in the direction indicated by arrows 6, thereby forming the swirling air-fuel-mixture 6. The air-fuel-mixture 6 flows in the direction as indicated by arrows 8 through the pre-chamber 5 into the main combustion chamber 9 where it combusts.

Figure 2:
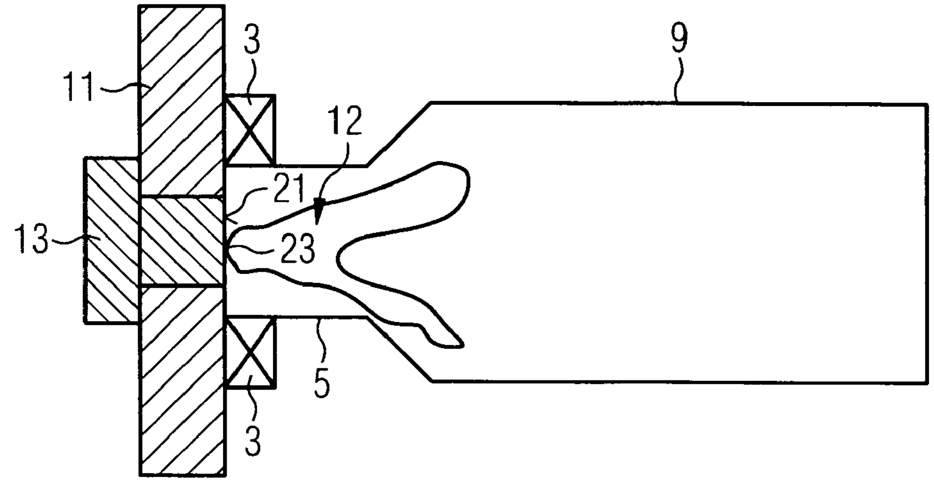
FIG. 2 schematically shows the location of the flame in the combustor, which is shown in FIG. 1, in a sectional view.

FIG. 2 schematically shows the location of the flame in the described combustor in a sectional view. One can see in FIG. 2 the burner-head plate 11, the radial swirler 3, the pre-chamber 5 and the main combustion chamber 9. The burner-head plate 11 comprises a removable assembly 13. The combusting mixture of air and fuel forms a flame which follows the region of low pressure 12. The base of the low pressure region 12, which defines the base of the flame 23, is attached to the inner side 21 of the removable assembly 13.

Figure 3:
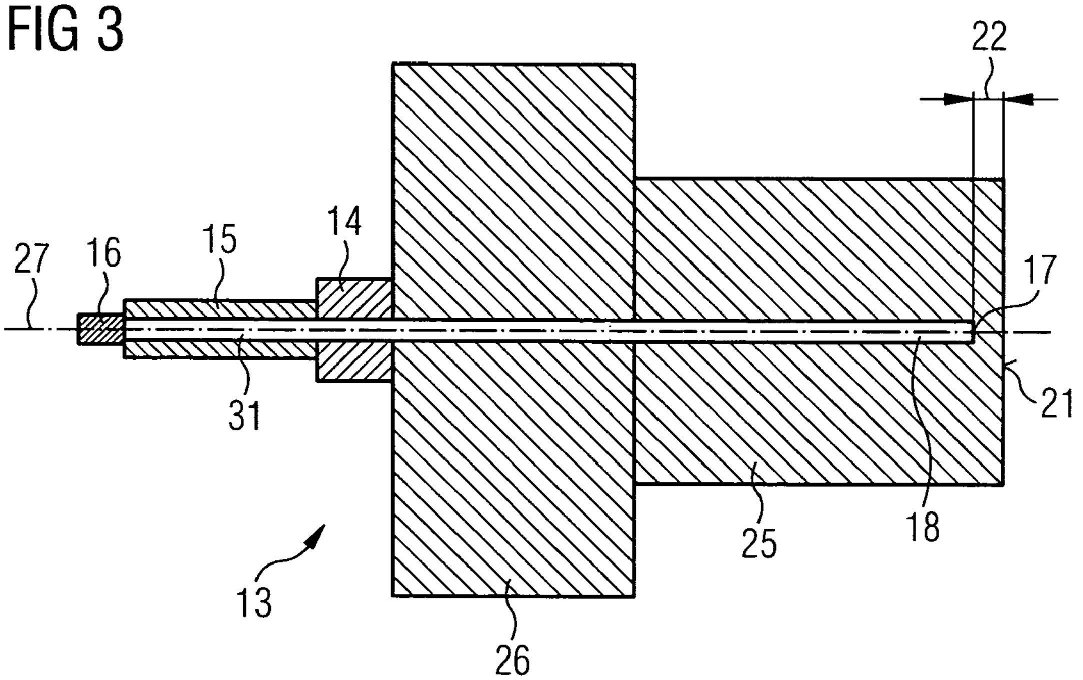
FIG. 3 schematically shows a removable assembly of the burner, where the sensor is located, in a sectional view.

In FIG. 3 the removable assembly 13 is schematically shown in a sectional view. The removable assembly 13 comprises a plug 25 and a cover plate 26, which is connected to the plug 25. The plug 25 is an element which fits into a central hole in the burner-head plate 11 and the cover plate 26 is used to fix the removable assembly 13 to the burner-head plate 11.

The removable assembly 13 further comprises a blind hole 18 which is located in the centre of the removable assembly 13 along the centre line 27. Alternatively, the blind hole 18 may be positioned in the removable assembly parallel to the centre line 27, but not in the centre of the removable assembly 13. The blind hole 18 extends through the cover plate 26 and through a major part of the plug 25. The bottom 17 of the blind hole 18 has a relatively small distance 22 to the inner surface 21 of the removable assembly 13. While the inner surface 21 shows towards the flame, i.e. towards the interior of the combustion chamber, the surface of the bottom 17 of the hole 18 shows away from the interior of the combustion chamber and can thus be regarded as an outer surface of the burner as seen from the interior of the combustion chamber. Hence, the bottom 17 of the hole 18 forms a wall section with inner side 21 which shows towards a combustion zone, and an outer side which shows away from the combustion zone.

Moreover, the removable assembly 13 comprises a pipe fitting 14, a tube extension piece 15 and an embedded photodiode 16. The pipe fitting 14 is connected to the cover plate 27. Moreover, the pipe fitting 14 connects the removable assembly 13 to the tube extension pieca_5_aNd_the embedded photodiode 16. A bore 31 extends entirely though the pipe fitting 14 and the extension piece 15 and is aligned with the blind hole 18. The photodiode 16 is fixed to the end of the tube extension piece 15 and closes the bore 31.

The hole 18 is concentric to the bore of the pipe fitting 14, such as a Swagelock fitting. The length of the blind hole 18, the pipe fitting 14 and the tube extension piece 15 are such as to provide a collimated viewing angle from the photodiode's sensor to the bottom of the blind hole 17.

The blind hole 18 is formed in the removable assembly 13 with a flat bottom face 17. The hole 18 may be reamed flat to a distance 22 to the inner surface 21 of the removable assembly. The distance 22 is specified by the material properties of the assembly 13 in such a way as to provide an optimal heat transfer from the inner surface 21 of the removable assembly 13 to the bottom 17 of the hole 18.

During operation of the burner the inner surface 21 is exposed to the base of a flame 23. This increases the temperature of the inner surface 21 and, through thermal conduction, also the temperature at the surface of the bottom 17 of the blind hole 18 raises. When this occurs the surface of the bottom 17 radiates electromagnetic radiation which the photodiode 16 is sensitive to. Radiation from the surrounding walls of the hole do not interfere substantially with the photodiode 16 since the length of the hole 18, the pipe fitting 14 and the tube extension piece 15 collimates the viewing angle such that the electromagnetic radiation from the bottom of the hole 17 dominates the radiation seen by the photodiode 16.

Figure 4:
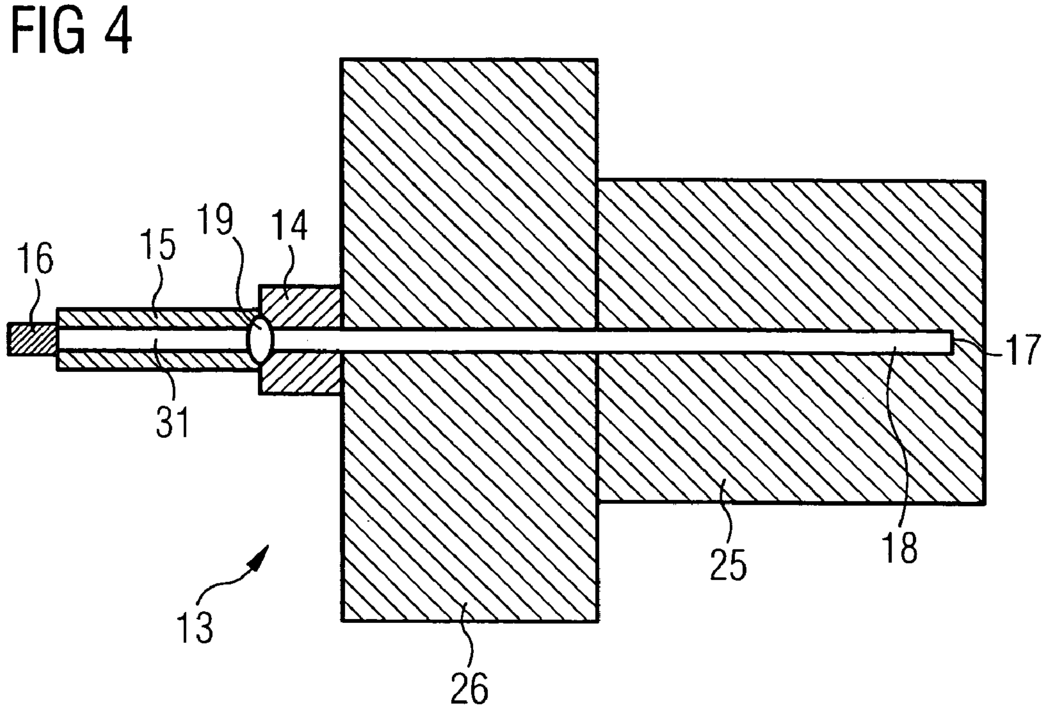
FIG. 4 schematically shows the removable assembly which is shown in FIG. 3 with an additional lens arrangement.

The sensitivity of this configuration may be enhanced through the use of an optical lens 19 or other focusing means, which may be mounted as indicated by lens 19 in FIG. 4. FIG. 4 schematically shows a respective variant of the removable assembly 13 of FIG. 3 in a sectional view. The optical lens 19 is mounted inside the bore 31 between the pipe fitting 14 and the tube extension piece 15. In this configuration the lens 19 is located such that the focal point of the lens 19 is located on the surface of the bottom 17 of the blind hole 18. The use of a focussing lens increases the accuracy and the sensitivity of the measurement.

Figure 5:
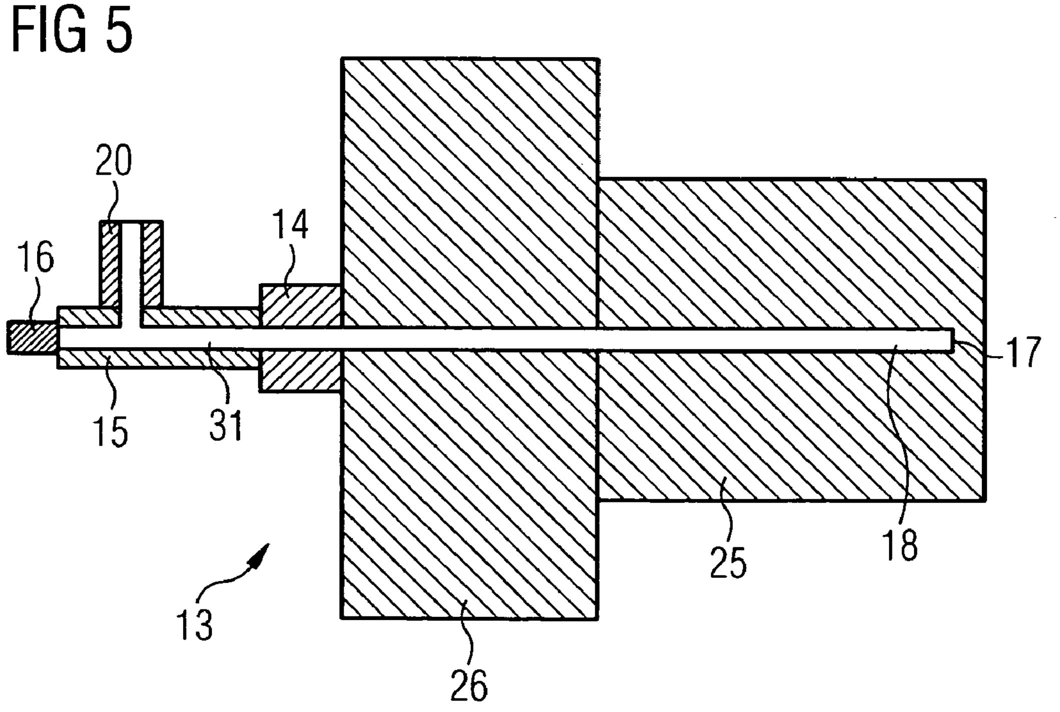
FIG. 5 schematically shows the removable assembly which is shown in FIG. 3 with an additional feature to enable the sensor to be filled with inert gases.

The removable assembly 13 may be additionally equipped with a gas filling port 20, as it is shown in FIG. 5. FIG. 5 schematically shows a respective variant of the removable assembly 13 of FIG. 3 in a sectional view. In this variant of the embodiment, the hole 18 is connected to a filling port 20 which is, in the present embodiment, a gas filling port. Of course, it is possible to equip the removable assembly 13 with more than one gas filling port 20. Especially in the case that a lens 19 inside the hole 18 is used, it may be useful to equip the removable assembly 13 with two or more gas filling ports 20 to provide accesses to the parts of the hole 18 on both sides of the lens 19. If only one gas filling port is present in a variant with a lens the gas filling port would be located between the lens and the cover plate 26.

In the embodiment shown in FIG. 5, the gas filling port 20 is connected to the tube extension piece 15 since no lens is present. It comprises a flow channel which is connected to the bore 31 and may be used to evacuate the bore 31 and the blind hole 18 or to fill the bore 31 and the blind hole 18 with a gas. The filling gas may be an inert gas, for instance nitrogen. This reduces the oxidation of the surface of the bottom 17 of the blind hole 18. Alternatively, the blind hole 18 may also be filled with a suitable liquid.

The flame inside the combustion chamber heats up the inner surface 21 of the removable assembly 13. The heat is transferred through the wall and heats up the bottom 17 of the blind hole 18. Due to its increased temperature the bottom 17 emits electromagnetic radiation. This radiation propagates through the hole 18 and is detected by the photodiode 16. The results of this measurement can be used to determine the temperature of the bottom of the hole 17. By taking into account the distance 22 and the heat transfer coefficient of the material of the plug 25 also the temperature of the flame inside the combustion chamber and the heat release rate can be determined.

Figure 6:
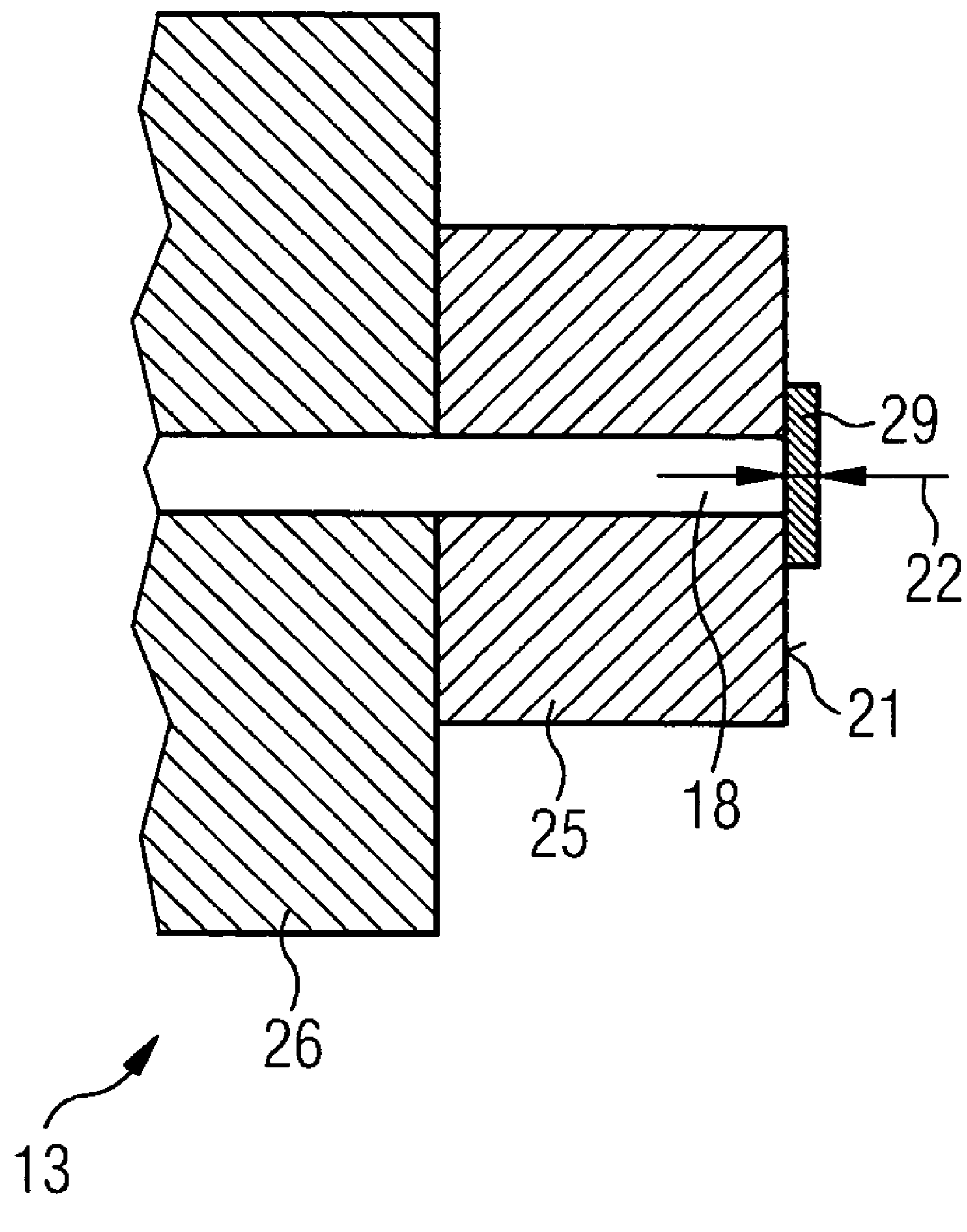
FIG. 6 schematically shows a part of a removable assembly in a sectional view.

The speed of response of the measurement to changes in the flame temperature at the inner surface 21 of the removable assembly 13 is dependent on the heat transfer coefficient of the assembly 13, in particular of the material of the plug 25, and the distance 22. The heat transfer coefficient and the distance 22 can be adjusted by using a separate bottom plate 29 as wall between the hole 118 and the inner side of the burner. In this case, the hole is not a blind hole but a through hole 118 which is closed to the interior of the combustion chamber by the bottom plate 29. This alternative solution is shown in FIG. 6 which shows a part of the removable assembly 13 in a sectional view. One can see the plug 25 and a part of the cover plate 26. The plug 25 and the cover plate 26 comprise the through hole 118. At the side of the plug, which forms the inner surface 21 of the removable assembly 13, the hole 18 is closed by the bottom plate 29. The distance 22 is now determined by the thickness of the bottom plate 29. The bottom plate 29 is fixed to the plug 25, for instance by welding, soldering or a detachable connection.

When the bottom plate 29 is detachably fixed to the plug 25 the heat transfer characteristics can be changed just by exchanging the bottom plate for another bottom plate with, for example, a different thickness and/or different material characteristics. The use of a separate bottom plate 29 made of a suitable material therefore allows for individual adjustment of the heat transfer coefficient and the distance 22 dependent on the requirements of the particular burner and the used sensor 16. The adjustment is independent of the characteristics of the material of the plug 25.

Of course, all described variations and alternatives can be combined. For example, an inventive removable assembly can comprise a bottom plate 29, a lens 19 and one or more gas filling ports 20. Generally, the sensor is a seal unit and as a result the optical system is not compromised by water washing of the machine's compressor.

Figure 7:
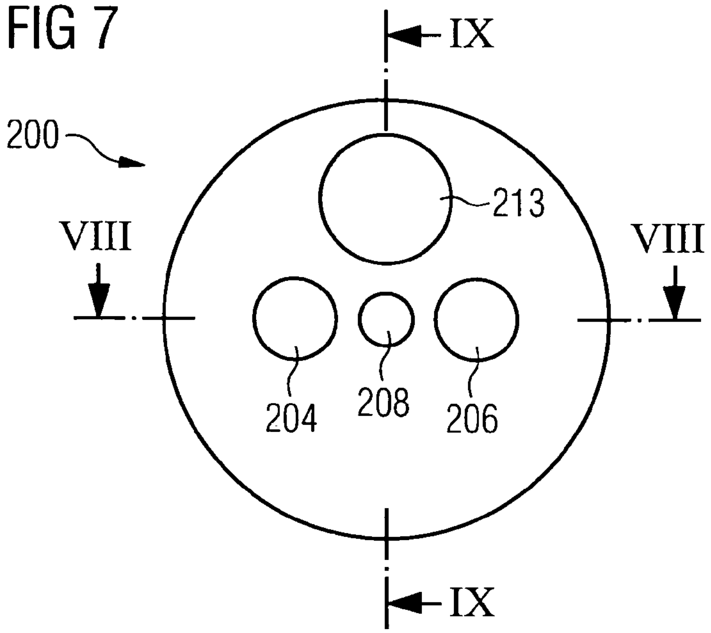
FIG. 7 shows a cylinder of an internal combustion engine in a top view.
Figure 8:
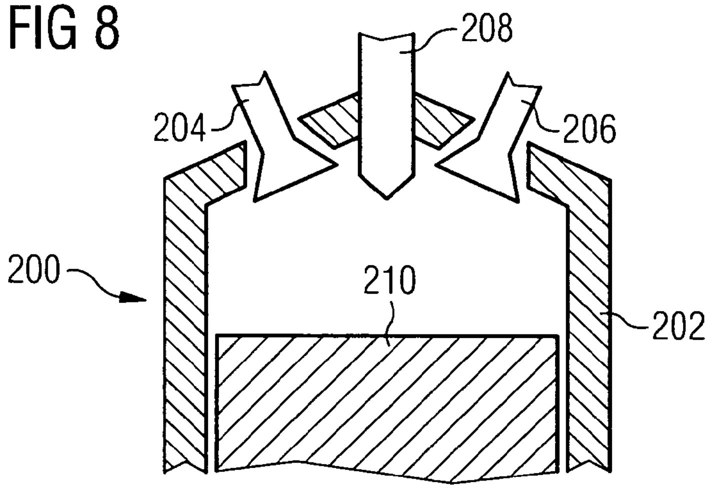
FIG. 8 shows a first section through the cylinder.
Figure 9:
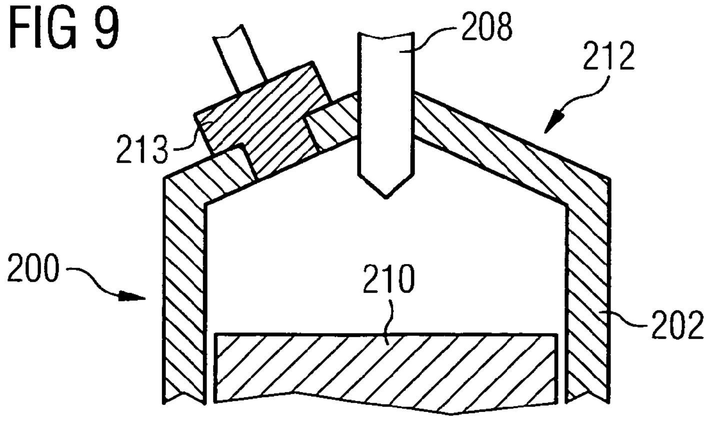
FIG. 9 shows a second section through the cylinder.

FIGS. 7 to 9 show a cylinder of an internal combustion engine with a removable assembly 213 which allows for monitoring the temperature inside the cylinder. While FIG. 7 shows a top view onto the cylinder 200, FIGS. 8 and 9 show cuts through the cylinder taken in mutually perpendicular directions.

FIG. 8 shows a section through the cylinder 200 in which a cylinder wall 202, the inlet and outlet valves 204, 206, respectively, the spark plug 208 and a piston 210 are partly shown. FIG. 9 shows a section through the cylinder 200 which is perpendicular to the section shown in FIG. 8. The relation between the two sections is shown in FIG. 7. The removable assembly 213 is located in the cylinder head 212 beside the spark plug 208. The arrangement of the spark plug 208, the valves 204, 206 and the removable assembly 213 can be best seen in FIG. 7. The design of the removable assembly can be the same as has been described with respect to FIGS. 3 to 6 in conjunction with the gas turbine burner.

Although a specific location of the removable assembly 213 is shown in FIGS. 7 to 8, other locations are also possible as long as the location allows for placing the removable assembly such as to show towards the flame in the cylinder.

In summary, the invention provides the possibility to monitor a flame inside a combustion chamber or a cylinder by optical means.

The invention claimed is:

1. A method for monitoring a flame in a combustion chamber, comprising:

providing a wall with an outer side facing away from the flame and an inner side facing towards the flame in the combustion chamber;

optically detecting a radiation emitted from a part of the outer side of the wall by a sensor, the radiation being emitted in response to heat transfer from the inner side to the outer side of the wall; and relating the radiation emitted from the part of the outer side of the wall to a heat transfer characteristic of the wall to determine at least one of a temperature of the flame in the combustion chamber and a heat release rate of the flame.

2. The method as claimed in claim 1, wherein the detected radiation is focused on the sensor.

3. The method as claimed in claim 2, wherein the emitted radiation is detected from the corresponding inner side of the part of the wall which is exposed to the flame.

4. The method of claim 1, further comprising selecting the heat transfer characteristic of the wall, wherein the selecting of the heat transfer characteristic of the wall comprises selecting at least a thickness of the wall and/or a heat transfer coefficient of the wall.

5. A burner, comprising:

a wall section having a heat transfer characteristic, an inner side that faces toward a combustion zone, and an outer side that faces away from the combustion zone; and a sensor that optically detects a radiation emitted from the outer side of the wall section, wherein the radiation is emitted in response to heat transfer from the inner side to the outer side of the wall section, wherein the detected radiation is related to the heat transfer characteristic of the wall section to determine at least one of a temperature of the flame in the combustion chamber and a heat release rate of the flame.

6. The burner as claimed in claim 5, wherein the sensor is a photodiode.

7. The burner as claimed in claim 6, further comprising an element that focuses the emitted radiation on the sensor.

8. The burner as claimed in claim 7, wherein the element is an optical lens.

9. The burner as claimed in claim 8, wherein the outer side of the wall section forms the bottom of a hole and the sensor is positioned to detect the radiation emitted from the bottom of the hole.

10. The burner as claimed in claim 9, wherein the sensor is located at a distance to the bottom of the hole.

11. The burner as claimed in claim 10, wherein the hole is evacuated or filled with an inert gas.

12. The burner as claimed in claim 11, further comprising a light emitting diode that determines the state of the sensor.

13. The burner of claim 5, wherein said at least one of the temperature of the flame in the combustion chamber and the heat release rate of the flame is determined based at least in part on a thickness of the wall section and a heat transfer coefficient of the wall section.

14. A gas turbine, comprising:

an inlet section that admits a working fluid;

a compressor section that receives the admitted working fluid and provides a compressed working fluid;

a combustion section that receives the compressed working fluid and mixes the compressed working fluid with a fuel and combusts the fuel and compressed fluid mixture to provide a hot working fluid, the combustion section comprising a burner having:

a wall section having a heat transfer characteristic;

an inner side that faces toward a combustion zone, and an outer side that faces away from the combustion zone; and a sensor that optically detects a radiation emitted from the outer side of the wall section, wherein the radiation is emitted in response to heat transfer from the inner side to the outer side of the wall section, wherein the detected radiation is related to the heat transfer characteristic of the wall section to determine at least one of a temperature of the flame in the combustion chamber and a heat release rate of the flame; and a turbine section that expands the hot working fluid to extract mechanical energy.

15. The gas turbine as claimed in claim 14, wherein the sensor is a photodiode.

16. The gas turbine as claimed in claim 15, further comprising an optical lens that focuses the emitted radiation on the sensor.

17. The gas turbine as claimed in claim 16, wherein the outer side of the wall section forms the bottom of a hole and the sensor is positioned to detect the radiation emitted from the bottom of the hole.

18. The gas turbine as claimed in claim 17, wherein the sensor is located at a distance to the bottom of the hole.

19. The gas turbine as claimed in claim 18, wherein the hole is evacuated or filled with an inert gas.

20. The gas turbine as claimed in claim 19, further comprising a light emitting diode that determines the state of the sensor.

21. The turbine of claim 14, wherein said at least one of the temperature of the flame in the combustion chamber and the heat release rate of the flame is determined based at least in part on a thickness of the wall section and a heat transfer coefficient of the wall section.

* * * * *